June 26, 1928.

E. E. RICHARDSON

CABLE TERMINAL FOR BATTERIES 1,674,799

Filed March 16, 1926

INVENTOR:-
EARL E. RICHARDSON

BY Edward E. Longan
ATTORNEY.

Patented June 26, 1928.

1,674,799

UNITED STATES PATENT OFFICE.

EARL E. RICHARDSON, OF QUINCY, ILLINOIS.

CABLE TERMINAL FOR BATTERIES.

Application filed March 16, 1926. Serial No. 95,004.

My invention relates to improvements in cable terminals for batteries, and has for its primary object a cable terminal intended primarily for storage batteries which can be readily attached to and removed from the post of a storage battery.

A further object is to construct a cable terminal for storage batteries in which a wedging action is employed to secure the terminal to a battery post, the terminal itself being loosely fitted over the post so that it will not become cemented thereon by corrosion.

A still further object is to construct a cable terminal for storage batteries which can be readily attached and detached to the posts of the battery and in which no springing of the terminal is necessary in order to release it from the posts.

Figure 1:
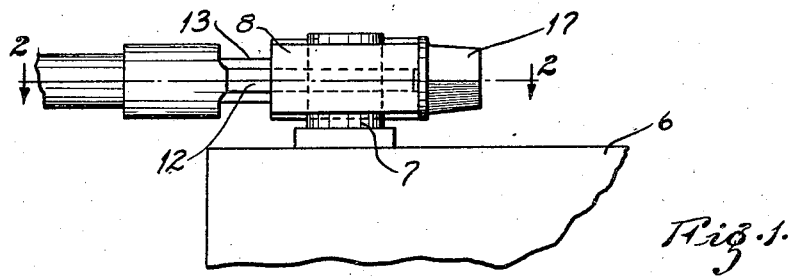
Fig. 1 is a fragmental view of a storage battery with my device in position.
Figure 2:
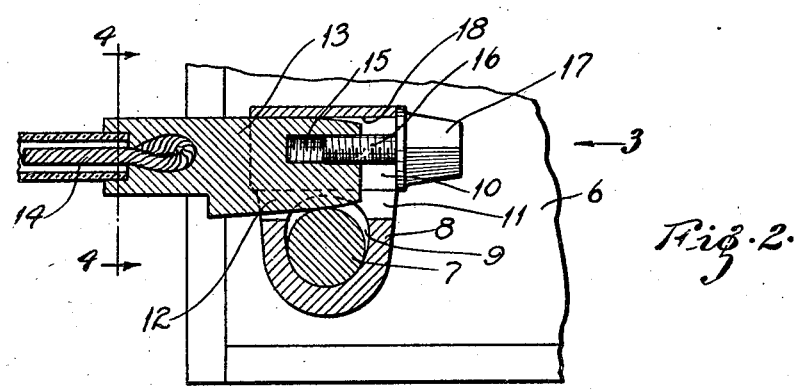
Fig. 2 is a horizontal section of the same taken on the line 2—2 of Fig. 1.
Figure 3:
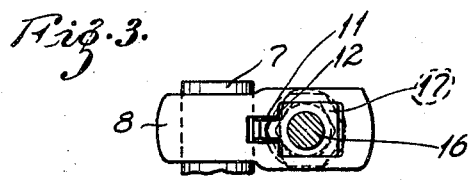
Fig. 3 is an end view viewing the same in the direction of the arrow 3 of Fig. 2.

In the construction of my device 6 represents a battery box and 7 one of the battery posts. As is well known each storage battery has posts, one being negative, the other positive. However as these posts are of identical construction, they will not be described in detail. Surrounding the post 7 is a yoke 8 which is provided with a cylindrical or elongated opening 9 designed to fit around the post 7. This opening 9, however, is of a larger diameter than the post 7 so that it will readily fit thereon. The opening 9 extends in a vertical direction, and at right angles to the opening 9 is an opening 10, which is preferably rectangular and which is spaced apart from the opening 9. The opening 10 is provided in its side adjacent the opening 9 with a slot or passageway 11 in which the wedge member 12 formed integral with one side of the terminal 13 is adapted to fit. This passageway or slot is so arranged that the post 7 will project therein (see Fig. 2) so that the wedge tongue or key 12 may contact therewith. An electric cable 14 is secured in the terminal in any well-known manner. The terminal 13 is also provided with a screw threaded bore 15 to receive the screw 16 by means of which the wedge can be drawn inward so that it will tightly bind against the post 7. The screw 16 is provided with the usual head 17 which is flanged so that the terminal 13 can be pulled into the socket or opening 10 when the screw is tightened thus causing the wedge 12 to bind tightly against the post 7 and hold it in position against the post. The reason for having the opening 9 larger than the post 7 is to permit the wedge 12 to exercise its function of drawing the yoke tightly against the post but as soon as the terminal 13 is removed from the yoke, the yoke can be readily removed from the post thus obviating the possibility of twisting off the post from the plates or of twisting the yoke and breaking it loose from the post as is the case where the yokes are soldered or burnt on to the post as is the common practice today. Neither is it necessary to use any tools, such as screw drivers or the like to loosen the terminals, as is now employed where clamping yokes are secured to the posts for the reason that the opening in the yoke is so large that it is practically impossible for it to become tightly corroded to the post.

It is, of course, to be understood that the terminal 13 before being inserted in the yoke is properly coated with grease as is now the common practice.

The method of applying my terminal to a battery post is as follows:

The yoke 8 is first greased, both in the bore 9 and in the opening 10, the terminal 13 is also properly greased on its outer surface and is then inserted in the yoke with the tongue 12 in the slot or passageway 11. The screw 16 is then inserted in the screw threaded bore 16 and tightened. This draws the terminal 13 into the yoke and in so doing the wedge 12 contacts with the post 7 and rides thereon forcing the opposite end of the terminal against the wall 18 of the yoke. This wall resisting any farther outward movement of the terminal from the post causes the wedge 12 to bind tightly against the post thus assuring a tight firm contact. In removing the terminal all that is necessary is to unscrew or loosen the screw 16 a few turns and tap it with a hammer, driving it backward thus loosening the wedge 12 from the post, after which both yoke 8 and terminal 13 can be readily lifted from the post. This is due to the fact that the opening 9 is of considerably larger diameter than the post itself so that there are virtually two small points at which corrosion can cement the contacting faces tightly together as any corrosion in the remainder of the opening 9 will be relatively loose so that there will be absolutely no danger of twisting off the post.

In batteries as heretofore constructed, the yoke, which surrounded the post, fitted tightly thereto and any corrosion, which might occur between the surfaces of the yoke and post, only tended to tighten the yoke all the more so that when an attempt was made to remove the yoke, it frequently resulted in twisting off the battery post, making it necessary to rebuild the battery or at least tear it apart and secure a new crow's foot to the plates. This operation was almost as expensive as rebuilding the battery as it necessitated tearing the entire device down. With my structure, all of this is eliminated because as soon as the terminal is removed from the yoke, the yoke is free to play on the post thus obviating all danger of it twisting off the post and it takes only a slight movement of the wedge 12 to release the yoke completely from the post.

Figure 5:
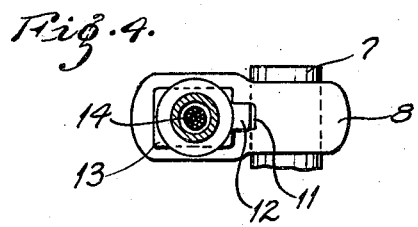
Fig. 5 is an end view of a modified form of terminal yoke.
Figure 4:
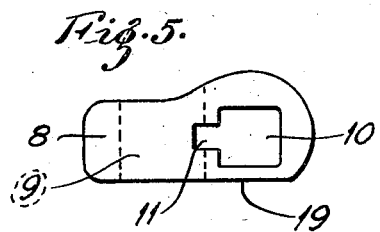
Fig. 4 is a cross section taken on the line 4—4 of Fig. 2.

In Fig. 5 I have shown a modified form of yoke in which the undersurface 19 is made flat. This permits my device to be easily applied to batteries which have short posts so that it is not necessary to have a peculiar or particular construction of post to receive my terminal and terminal yoke. Furthermore in the construction of my device, it is preferred that the posts 7 be cylindrical rather than tapered since less pressure is required to keep the yoke and terminal in position and there is absolutely no possibility of jolting, moving the terminal yoke upward and causing it to become accidentally disconnected from the post. In fact by the wedge of my device a flattened place will be formed in the post leaving the material above it projecting outward and above the wedge 12 thus further preventing any upward movement of the yoke and the consequent disengagement of the cable from the post to which it is attached.

Having fully described my invention, what I claim is:

1. A battery terminal comprising a yoke having an elongated opening therethrough, a rectangular opening formed in said yoke and at right angles to the first mentioned opening and spaced apart therefrom, a passageway formed in said second opening and intersecting said first opening, and a terminal plug provided with a projecting wedge shaped member located in said second mentioned opening, said wedge shaped member adapted to fit in said passageway and extend into the first mentioned opening whereby said yoke can be secured to a battery post located in the first mentioned opening.

2. A battery terminal comprising a yoke having a vertical elongated opening and a horizontal rectangular opening formed therethrough, a passageway formed in the horizontal opening intermediate its top and bottom edges and intersecting said vertical opening, a rectangular plug adapted to fit in said horizontal opening, a wedge formed integral with said plug and adapted to extend into said vertical opening, and means screw seated in said plug for drawing the same into said horizontal opening thereby causing said wedge to tightly bind against the terminal post of a battery extending through the vertical opening.

In testimony whereof I have affixed my signature.

EARL E. RICHARDSON.